US010476640B2

(12) United States Patent
Li et al.

(10) Patent No.: US 10,476,640 B2
(45) Date of Patent: Nov. 12, 2019

(54) CARRIER CONFIGURATION METHOD AND DEVICE

(71) Applicant: HUAWEI TECHNOLOGIES CO., LTD., Shenzhen, Guangdong (CN)

(72) Inventors: Bingzhao Li, Beijing (CN); Xiaodong Yang, Shenzhen (CN); Wei Quan, Beijing (CN); Jinhua Miao, Beijing (CN); Zhenxing Hu, Shenzhen (CN); Jian Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 53 days.

(21) Appl. No.: 15/708,699

(22) Filed: Sep. 19, 2017

(65) Prior Publication Data

US 2018/0006775 A1  Jan. 4, 2018

Related U.S. Application Data

(63) Continuation of application No. PCT/CN2015/074745, filed on Mar. 20, 2015.

(51) Int. Cl.
*H04L 5/00* (2006.01)
*H04W 72/04* (2009.01)
*H04W 72/02* (2009.01)

(52) U.S. Cl.
CPC ............ *H04L 5/001* (2013.01); *H04L 5/0051* (2013.01); *H04W 72/02* (2013.01); *H04W 72/04* (2013.01); *H04W 72/042* (2013.01)

(58) Field of Classification Search
CPC ......... H04L 5/001; H04L 5/0051; H04L 5/00; H04W 72/02; H04W 72/04; H04W 72/042
See application file for complete search history.

(56) References Cited

U.S. PATENT DOCUMENTS

| 2008/0287068 | A1* | 11/2008 | Etemad | ................. | H04L 5/0007 455/68 |
| 2011/0026475 | A1* | 2/2011 | Lee | ......................... | H04L 5/001 370/329 |
| 2011/0261704 | A1* | 10/2011 | Etemad | ............. | H04W 52/0216 370/252 |
| 2012/0044812 | A1* | 2/2012 | Hiddink | ............ | H04W 36/0044 370/241 |

(Continued)

FOREIGN PATENT DOCUMENTS

CN  101754380 A  6/2010
CN  101883398 A  11/2010
(Continued)

OTHER PUBLICATIONS

IP.com, patent search; Jun. 28, 2019 (Year: 2019).*
(Continued)

*Primary Examiner* — Benjamin H Elliott, IV
(74) *Attorney, Agent, or Firm* — Kilpatrick Townsend & Stockton LLP

(57) ABSTRACT

The present invention discloses a carrier configuration method and a device, and relates to the field of communications, to resolve a problem that dividing multiple component carriers into primary and secondary component carriers only is not conducive to management of an important secondary component carrier. In a specific solution, a carrier aggregation model is configured for UE, so that the UE performs data transmission with a network device according to the carrier aggregation model. The carrier aggregation model includes multiple component carriers, the multiple component carriers include at least one core carrier, and the at least one core carrier includes at least one primary core carrier. The core carrier has an uplink transmission function and a downlink transmission function. The present invention is applied to a carrier configuration process.

14 Claims, 6 Drawing Sheets

(56) References Cited

U.S. PATENT DOCUMENTS

| | | | |
|---|---|---|---|
| 2012/0057524 A1* | 3/2012 | Yu | H04W 72/02 370/328 |
| 2012/0281544 A1* | 11/2012 | Anepu | H04B 7/024 370/241 |
| 2013/0064219 A1* | 3/2013 | Siomina | H04W 64/00 370/331 |
| 2013/0121167 A1* | 5/2013 | Wong | H04W 76/20 370/242 |
| 2013/0294312 A1* | 11/2013 | Chen | H04W 52/16 370/311 |
| 2013/0322365 A1* | 12/2013 | Garcia Martin | H04W 72/048 370/329 |
| 2014/0012813 A1* | 1/2014 | Oh | G06Q 10/109 707/635 |
| 2015/0050941 A1* | 2/2015 | Sawada | H04W 36/06 455/452.2 |
| 2015/0341885 A1* | 11/2015 | Sebire | H04W 56/0045 370/336 |
| 2018/0006775 A1* | 1/2018 | Li | H04W 72/04 |

FOREIGN PATENT DOCUMENTS

| | | | |
|---|---|---|---|
| CN | 102685891 A | 9/2012 | |
| JP | 2013524661 A | 6/2013 | |
| WO | WO 2011/102686 A2 | 8/2011 | |
| WO | 2013136906 A1 | 9/2013 | |

OTHER PUBLICATIONS

IP.com, NPL search; Jun. 28, 2019 (Year: 2019).*
Extended European Search Report, dated Mar. 1, 2018, in European Application No. 15885814.2 (7 pp.).
International Search Report dated Dec. 25, 2015 in corresponding International Patent Application No. PCT/CN2015/074745.
3GPP TS 36.321 V12.4.0 $3^{rd}$ Generation Partnership Project; Technical Specification Group Radio Access Network; Evolved Universal Terrestrial Radio Access (E-UTRA), "Medium Access Control (MAC) protocol specification (Release 12)," Sophia Antipolis, France, Dec. 2014, pp. 1-60.
3GPP TS 36.331 V12.4.1 $3^{rd}$ Generation Partnership Project; Technical Specification Group Radio Access Network; Evolved Universal Terrestrial Radio Access (E-UTRA); "Radio Resource Control (RRC); Protocol specification (Release 12)," Sophia Antipolis, France, Dec. 2014, pp. 1-410.
Notice of Reasons for Rejection, dated Oct. 5, 2018, in Japanese Application No. 2017567512 (18 pp.).
Chinese Office Action dated Apr. 24, 2019 in Chinese Application No. 201580076226.2 (7 pages).

* cited by examiner

A network device configures a carrier aggregation model for UE, so that the UE performs data transmission with the network device according to the carrier aggregation model — 101

FIG. 1

UE receives a carrier aggregation model sent by a network device — 201

The UE performs data transmission with the network device according to the carrier aggregation model — 202

FIG. 2

CARRIER CONFIGURATION METHOD AND DEVICE

CROSS-REFERENCE TO RELATED APPLICATION

This application is a continuation of International Application No. PCT/CN2015/074745, filed on Mar. 20, 2015, the disclosure of which is hereby incorporated by reference in its entirety.

TECHNICAL FIELD

The present invention relates to the field of communications, and in particular, to a carrier configuration method and a device.

BACKGROUND

In the mobile communications technologies, limited spectrum resources are a major factor hindering improvement of system performance. As mobile users grow rapidly and new services call for efficient data transmission, how to effectively improve spectrum efficiency has become a hot topic of research in the industry.

In the prior art, a carrier aggregation technology is one of methods for effectively improving spectrum efficiency. The carrier aggregation technology means that a service is provided to user equipment (English: User Equipment, UE for short) by simultaneously using multiple component carriers. In the multiple component carriers that simultaneously provide the service for the UE, generally, one component carrier is a primary component carrier, and the other component carriers are secondary component carriers.

There are at least the following problems in the prior art. In the carrier aggregation technology, there are only two roles: primary component carriers and secondary component carriers, and no further roles are assigned to secondary component carriers. Actually, these secondary component carriers also vary in importance according to their different bearer functions. For example, a secondary component carrier with a better bearer function has a higher degree of importance than a secondary component carrier with a worse bearer function. In this case, dividing the multiple component carriers into the primary and secondary component carriers only is not conducive to management of an important secondary component carrier.

SUMMARY

The present invention provides a carrier configuration method and a device, to resolve a problem that dividing multiple component carriers into primary and secondary component carriers only is not conducive to management of an important secondary component carrier.

To achieve the foregoing objective, the present invention uses the following technical solutions:

According to a first aspect of the present invention, a carrier configuration method is provided, including:

configuring a carrier aggregation model for user equipment UE, so that the UE performs data transmission with a network device according to the carrier aggregation model, where the carrier aggregation model includes multiple component carriers, the multiple component carriers include at least one core carrier, and the at least one core carrier includes at least one primary core carrier the core carrier has an uplink transmission function and a downlink transmission function, the uplink transmission function includes at least one of the following: an uplink feedback function corresponding to downlink data, a downlink channel state feedback function, or an uplink data transmission function, and the downlink transmission function includes at least one of the following: a downlink feedback function corresponding to uplink data, an uplink channel state feedback function, or a downlink data transmission function; and the primary core carrier has at least one of the following functions: a system message bearing function, a paging message bearing function, a semi-static scheduling parameter configuration function, a camping reference function, or an encryption reference function.

With reference to the first aspect, in a possible implementation, before the configuring a carrier aggregation model for user equipment UE, the method further includes:

determining a component carrier among the multiple component carriers that has the uplink transmission function and the downlink transmission function as the core carrier.

With reference to the first aspect and the foregoing possible implementation, in another possible implementation, when the multiple component carriers include at least two core carriers, after the configuring a carrier aggregation model for user equipment UE, the method further includes:

determining to change the primary core carrier;

determining a new primary core carrier from a secondary core carrier, where the secondary core carrier is a core carrier other than the primary core carrier among the at least two core carriers; and sending a primary core carrier change notification message to the UE, so that the UE changes the primary core carrier to the new primary core carrier, where the primary core carrier change notification message is used to instruct the UE to change the primary core carrier.

With reference to the first aspect and the foregoing possible implementations, in another possible implementation, the sending a primary core carrier change notification message to the UE includes: sending the primary core carrier change notification message to the UE by using physical layer signaling or Medium Access Control MAC layer signaling.

With reference to the first aspect and the foregoing possible implementations, in another possible implementation, after the sending a primary core carrier change notification message to the UE, the method further includes:

determining, according to a random access channel RACH procedure triggered by the UE, that the primary core carrier of the UE is successfully changed.

With reference to the first aspect and the foregoing possible implementations, in another possible implementation, the primary core carrier change notification message includes a dedicated preamble sequence.

With reference to the first aspect and the foregoing possible implementations, in another possible implementation, after the sending a primary core carrier change notification message to the UE, the method further includes:

determining, according to a RACH procedure triggered by the UE by using the dedicated preamble sequence and based on an uplink carrier corresponding to the new primary core carrier, that the primary core carrier of the UE is successfully changed.

With reference to the first aspect and the foregoing possible implementations, in another possible implementation, when the multiple component carriers include at least two core carriers, after the configuring a carrier aggregation model for user equipment UE, the method further includes:

receiving a notification that the primary core carrier of the UE is changed.

With reference to the first aspect and the foregoing possible implementations, in another possible implementation, the receiving a notification that the primary core carrier of the UE is changed includes:

receiving a RACH procedure that is triggered by the UE based on an uplink carrier corresponding to the new primary core carrier; and after the receiving a notification that the primary core carrier of the UE is changed, the method further includes:

determining, according to the RACH procedure, that the primary core carrier is changed.

With reference to the first aspect and the foregoing possible implementations, in another possible implementation, the receiving a notification that the primary core carrier of the UE is changed includes:

receiving an uplink message sent by the UE, where the uplink message is used to notify the network device that the primary core carrier is changed; and after the receiving a notification that the primary core carrier of the UE is changed, the method further includes:

determining, according to the uplink message, that the primary core carrier is changed.

With reference to the first aspect and the foregoing possible implementations, in another possible implementation, the receiving an uplink message sent by the UE includes:

receiving an SR that is sent by the UE based on one secondary core carrier supporting a scheduling request SR function;

allocating an uplink resource to the UE; and receiving the uplink message that is sent by the UE by using the uplink resource.

With reference to the first aspect and the foregoing possible implementations, in another possible implementation, when the multiple component carriers include at least two core carriers, after the configuring a carrier aggregation model for user equipment UE, the method further includes:

configuring a measurement event for the UE, where the measurement event is used to instruct, when signal quality or signal strength of a neighboring cell is greater than signal quality or signal strength of a cell corresponding to any one of the core carriers, the UE to report a measurement report to the network device.

According to a second aspect of the present invention, a carrier configuration method is provided, including:

receiving a carrier aggregation model sent by a network device; and performing data transmission with the network device according to the carrier aggregation model, where the carrier aggregation model includes multiple component carriers, the multiple component carriers include at least one core carrier, and the at least one core carrier includes at least one primary core carrier; the core carrier has an uplink transmission function and a downlink transmission function, the uplink transmission function includes at least one of the following: an uplink feedback function corresponding to downlink data, a downlink channel state feedback function, or an uplink data transmission function, and the downlink transmission function includes at least one of the following: a downlink feedback function corresponding to uplink data, an uplink channel state feedback function, or a downlink data transmission function; and the primary core carrier has at least one of the following functions: a system message bearing function, a paging message bearing function, a semi-static scheduling parameter configuration function, a camping reference function, or an encryption reference function.

With reference to the second aspect, in a possible implementation, when the multiple component carriers include at least two core carriers, after the receiving a carrier aggregation model sent by a network device, the method further includes:

receiving a primary core carrier change notification message sent by the network device; and changing the primary core carrier to a new primary core carrier according to the primary core carrier change notification message.

With reference to the second aspect and the foregoing possible implementation, in another possible implementation, after the changing the primary core carrier to a new primary core carrier according to the primary core carrier change notification message, the method further includes:

triggering a random access channel RACH procedure, so that the network device determines, according to the RACH procedure, that the primary core carrier is successfully changed.

With reference to the second aspect and the foregoing possible implementations, in another possible implementation, the primary core carrier change notification message includes a dedicated preamble sequence; and after the changing the primary core carrier to a new primary core carrier according to the primary core carrier change notification message, the method further includes:

triggering a RACH procedure by using the dedicated preamble sequence and based on an uplink carrier corresponding to the new primary core carrier, so that the network device determines, according to the dedicated preamble sequence, that the primary core carrier is successfully changed.

With reference to the second aspect and the foregoing possible implementations, in another possible implementation, when the multiple component carriers include at least two core carriers, after the receiving a carrier aggregation model sent by a network device, the method further includes:

determining to change the primary core carrier;

determining a new primary core carrier from a secondary core carrier, where the secondary core carrier is a core carrier other than the primary core carrier among the at least two core carriers; and notifying the network device that the primary core carrier is changed.

With reference to the second aspect and the foregoing possible implementations, in another possible implementation, the notifying the network device that the primary core carrier is changed includes:

triggering, based on an uplink carrier corresponding to the new primary core carrier, a RACH procedure, so that the network device determines, according to the RACH procedure, that the primary core carrier is changed.

With reference to the second aspect and the foregoing possible implementation, in another possible implementation, the notifying the network device that the primary core carrier is changed includes:

sending an uplink message to the network device, so that the network device determines, according to the uplink message, that the primary core carrier is changed, where the uplink message is used to notify the network device that the primary core carrier is changed.

With reference to the second aspect and the foregoing possible implementations, in another possible implementation, the sending an uplink message to the network device includes:

sending, based on one secondary core carrier supporting a scheduling request SR function, an SR to the network device;

receiving an uplink resource allocated by the network device to the UE; and sending the uplink message to the network device by using the uplink resource.

With reference to the second aspect and the foregoing possible implementations, in another possible implementation, the determining to change the primary core carrier includes:

when determining that a primary core link fails, determining to change the primary core carrier.

With reference to the second aspect and the foregoing possible implementations, in another possible implementation, the determining a new primary core carrier from a secondary core carrier includes:

determining the new primary core carrier from the secondary core carrier according to a preset rule, where the preset rule includes at least one of the following: a preset order, quality of a signal transmitted based on the secondary core carrier, or a cell identity corresponding to the secondary core carrier.

With reference to the second aspect and the foregoing possible implementations, in another possible implementation, when the multiple component carriers include at least two core carriers, after the receiving a carrier aggregation model sent by a network device, the method further includes:

receiving a measurement event sent by the network device; and determining, according to the measurement event, to report a measurement report to the network device when signal quality or signal strength of a neighboring cell is greater than signal quality or signal strength of a cell corresponding to any one of the core carriers.

According to a third aspect of the present invention, a network device is provided, including:

a configuration unit, configured to configure a carrier aggregation model for user equipment UE, so that the UE performs data transmission with a network device according to the carrier aggregation model, where the carrier aggregation model includes multiple component carriers, the multiple component carriers include at least one core carrier, and the at least one core carrier includes at least one primary core carrier, the core carrier has an uplink transmission function and a downlink transmission function, the uplink transmission function includes at least one of the following: an uplink feedback function corresponding to downlink data, a downlink channel state feedback function, or an uplink data transmission function, and the downlink transmission function includes at least one of the following: a downlink feedback function corresponding to uplink data, an uplink channel state feedback function, or a downlink data transmission function; and the primary core carrier has at least one of the following functions: a system message bearing function, a paging message bearing function, a semi-static scheduling parameter configuration function, a camping reference function, or an encryption reference function.

With reference to the third aspect, in a possible implementation, the network device further includes:

a determining unit, configured to: before the configuration unit configures the carrier aggregation model for the user equipment UE, determine a component carrier among the multiple component carriers that has the uplink transmission function and the downlink transmission function as the core carrier.

With reference to the third aspect and the foregoing possible implementation, in another possible implementation, when the multiple component carriers include at least two core carriers, the determining unit is further configured to: after the configuration unit configures the carrier aggregation model for the user equipment UE, determine to change the primary core carrier, and determine a new primary core carrier from a secondary core carrier, where the secondary core carrier is a core carrier other than the primary core carrier among the at least two core carriers; and the network device further includes:

a sending unit, configured to send a primary core carrier change notification message to the UE, so that the UE changes the primary core carrier to the new primary core carrier, where the primary core carrier change notification message is used to instruct the UE to change the primary core carrier.

With reference to the third aspect and the foregoing possible implementations, in another possible implementation, the sending unit is specifically configured to:

send the primary core carrier change notification message to the UE by using physical layer signaling or Medium Access Control MAC layer signaling.

With reference to the third aspect and the foregoing possible implementations, in another possible implementation, the determining unit is further configured to: after the sending unit sends the primary core carrier change notification message to the UE, determine, according to a random access channel RACH procedure triggered by the UE, that the primary core carrier of the UE is successfully changed.

With reference to the third aspect and the foregoing possible implementations, in another possible implementation, the primary core carrier change notification message includes a dedicated preamble sequence.

With reference to the third aspect and the foregoing possible implementations, in another possible implementation, the determining unit is further configured to: after the sending unit sends the primary core carrier change notification message to the UE, determine, according to a RACH procedure triggered by the UE by using the dedicated preamble sequence and based on an uplink carrier corresponding to the new primary core carrier, that the primary core carrier of the UE is successfully changed.

With reference to the third aspect and the foregoing possible implementations, in another possible implementation, when the multiple component carriers include at least two core carriers, the network device further includes:

a receiving unit, configured to: after the configuration unit configures the carrier aggregation model for the user equipment UE, receive a notification that the primary core carrier of the UE is changed.

With reference to the third aspect and the foregoing possible implementations, in another possible implementation, the receiving unit is specifically configured to:

receive a RACH procedure that is triggered by the UE based on an uplink carrier corresponding to the new primary core carrier; and the determining unit is further configured to: after the receiving unit receives the notification that the primary core carrier of the UE is changed, determine, according to the RACH procedure, that the primary core carrier is changed.

With reference to the third aspect and the foregoing possible implementations, in another possible implementation, the receiving unit is specifically configured to:

receive an uplink message sent by the UE, where the uplink message is used to notify the network device that the primary core carrier is changed; and the determining unit is further configured to: after the receiving unit receives the notification that the primary core carrier of the UE is changed, determine, according to the uplink message received by the receiving unit, that the primary core carrier is changed.

With reference to the third aspect and the foregoing possible implementations, in another possible implementation, the receiving unit is specifically configured to:

receive an SR that is sent by the UE based on one secondary core carrier supporting a scheduling request SR function;

allocate an uplink resource to the UE; and receive the uplink message that is sent by the UE by using the uplink resource.

With reference to the third aspect and the foregoing possible implementations, in another possible implementation, when the multiple component carriers include at least two core carriers, the configuration unit is further configured to: after the configuring a carrier aggregation model for user equipment UE, configure a measurement event for the UE, where the measurement event is used to instruct, when signal quality or signal strength of a neighboring cell is greater than signal quality or signal strength of a cell corresponding to any one of the core carriers, the UE to report a measurement report to the network device.

According to a fourth aspect of the present invention, user equipment is provided, including:

a receiving unit, configured to receive a carrier aggregation model sent by a network device; and a transmission unit, configured to perform data transmission with the network device according to the carrier aggregation model received by the receiving unit, where the carrier aggregation model includes multiple component carriers, the multiple component carriers include at least one core carrier, and the at least one core carrier includes at least one primary core carrier; the core carrier has an uplink transmission function and a downlink transmission function, the uplink transmission function includes at least one of the following: an uplink feedback function corresponding to downlink data, a downlink channel state feedback function, or an uplink data transmission function, and the downlink transmission function includes at least one of the following: a downlink feedback function corresponding to uplink data, an uplink channel state feedback function, or a downlink data transmission function; and the primary core carrier has at least one of the following functions: a system message bearing function, a paging message bearing function, a semi-static scheduling parameter configuration function, a camping reference function, or an encryption reference function.

With reference to the fourth aspect, in a possible implementation, when the multiple component carriers include at least two core carriers, the receiving unit is further configured to: after the receiving a carrier aggregation model sent by a network device, receive a primary core carrier change notification message sent by the network device; and the user equipment further includes:

a change unit, configured to change the primary core carrier to a new primary core carrier according to the primary core carrier change notification message received by the receiving unit.

With reference to the fourth aspect and the foregoing possible implementation, in another possible implementation, the user equipment further includes:

a trigger unit, configured to: after the change unit changes the primary core carrier to the new primary core carrier according to the primary core carrier change notification message, trigger a random access channel RACH procedure, so that the network device determines, according to the RACH procedure, that the primary core carrier is successfully changed.

With reference to the fourth aspect and the foregoing possible implementations, in another possible implementation, the primary core carrier change notification message includes a dedicated preamble sequence; and the trigger unit is further configured to: after the change unit changes the primary core carrier to the new primary core carrier according to the primary core carrier change notification message, trigger a RACH procedure by using the dedicated preamble sequence and based on an uplink carrier corresponding to the new primary core carrier, so that the network device determines, according to the dedicated preamble sequence, that the primary core carrier is successfully changed.

With reference to the fourth aspect and the foregoing possible implementations, in another possible implementation, when the multiple component carriers include at least two core carriers, the user equipment further includes:

a determining unit, configured to: after the receiving unit receives the carrier aggregation model sent by the network device, determine to change the primary core carrier, and determine a new primary core carrier from a secondary core carrier, where the secondary core carrier is a core carrier other than the primary core carrier among the at least two core carriers; and a notification unit, configured to notify the network device that the primary core carrier is changed.

With reference to the fourth aspect and the foregoing possible implementations, in another possible implementation, the notification unit is specifically configured to:

trigger, based on an uplink carrier corresponding to the new primary core carrier, a RACH procedure, so that the network device determines, according to the RACH procedure, that the primary core carrier is changed.

With reference to the fourth aspect and the foregoing possible implementations, in another possible implementation, the notification unit is specifically configured to:

send an uplink message to the network device, so that the network device determines, according to the uplink message, that the primary core carrier is changed, where the uplink message is used to notify the network device that the primary core carrier is changed.

With reference to the fourth aspect and the foregoing possible implementations, in another possible implementation, the notification unit is specifically configured to:

send, based on one secondary core carrier supporting a scheduling request SR function, an SR to the network device;

receive an uplink resource allocated by the network device to the UE; and send the uplink message to the network device by using the uplink resource.

With reference to the fourth aspect and the foregoing possible implementations, in another possible implementation, the determining unit is specifically configured to:

when determining that a primary core link fails, determine to change the primary core carrier.

With reference to the fourth aspect and the foregoing possible implementations, in another possible implementation, the determining unit is specifically configured to:

determine the new primary core carrier from the secondary core carrier according to a preset rule, where the preset rule includes at least one of the following: a preset order, quality of a signal transmitted based on the secondary core carrier, or a cell identity corresponding to the secondary core carrier.

With reference to the fourth aspect and the foregoing possible implementations, in another possible implementation, when the multiple component carriers include at least two core carriers, the receiving unit is further configured to: after the receiving a carrier aggregation model sent by a network device, receive a measurement event sent by the network device; and the determining unit is further configured to determine, according to the measurement event received by the receiving unit, to report a measurement report to the network device when signal quality or signal strength of a neighboring cell is greater than signal quality or signal strength of a cell corresponding to any one of the core carriers.

According to a fifth aspect of the present invention, a network device is provided, including:

a processor, configured to configure a carrier aggregation model for user equipment UE, so that the UE performs data transmission with a network device according to the carrier aggregation model, where the carrier aggregation model includes multiple component carriers, the multiple component carriers include at least one core carrier, and the at least one core carrier includes at least one primary core carrier; the core carrier has an uplink transmission function and a downlink transmission function, the uplink transmission function includes at least one of the following: an uplink feedback function corresponding to downlink data, a downlink channel state feedback function, or an uplink data transmission function, and the downlink transmission function includes at least one of the following: a downlink feedback function corresponding to uplink data, an uplink channel state feedback function, or a downlink data transmission function; and the primary core carrier has at least one of the following functions: a system message bearing function, a paging message bearing function, a semi-static scheduling parameter configuration function, a camping reference function, or an encryption reference function.

With reference to the fifth aspect, in a possible implementation, the processor is further configured to: before configuring the carrier aggregation model for the user equipment UE, determine a component carrier among the multiple component carriers that has the uplink transmission function and the downlink transmission function as the core carrier.

With reference to the fifth aspect and the foregoing possible implementation, in another possible implementation, when the multiple component carriers include at least two core carriers, the processor is further configured to: after the configuring a carrier aggregation model for user equipment UE, determine to change the primary core carrier, and determine a new primary core carrier from a secondary core carrier, where the secondary core carrier is a core carrier other than the primary core carrier among the at least two core carriers; and the network device further includes:

a transmitter, configured to send a primary core carrier change notification message to the UE, so that the UE changes the primary core carrier to the new primary core carrier, where the primary core carrier change notification message is used to instruct the UE to change the primary core carrier.

With reference to the fifth aspect and the foregoing possible implementations, in another possible implementation, the transmitter is specifically configured to:

send the primary core carrier change notification message to the UE by using physical layer signaling or Medium Access Control MAC layer signaling.

With reference to the fifth aspect and the foregoing possible implementations, in another possible implementation, the processor is further configured to: after the transmitter sends the primary core carrier change notification message to the UE, determine, according to a random access channel RACH procedure triggered by the UE, that the primary core carrier of the UE is successfully changed.

With reference to the fifth aspect and the foregoing possible implementations, in another possible implementation, the primary core carrier change notification message includes a dedicated preamble sequence.

With reference to the fifth aspect and the foregoing possible implementations, in another possible implementation, the processor is further configured to: after the transmitter sends the primary core carrier change notification message to the UE, determine, according to a RACH procedure triggered by the UE by using the dedicated preamble sequence and based on an uplink carrier corresponding to the new primary core carrier, that the primary core carrier of the UE is successfully changed.

With reference to the fifth aspect and the foregoing possible implementations, in another possible implementation, when the multiple component carriers include at least two core carriers, the network device further includes:

a receiver, configured to: after the processor configures the carrier aggregation model for the user equipment UE, receive a notification that the primary core carrier of the UE is changed.

With reference to the fifth aspect and the foregoing possible implementations, in another possible implementation, the receiver is specifically configured to:

receive a RACH procedure that is triggered by the UE based on an uplink carrier corresponding to the new primary core carrier; and the processor is further configured to: after the receiver receives the notification that the primary core carrier of the UE is changed, determine, according to the RACH procedure, that the primary core carrier is changed.

With reference to the fifth aspect and the foregoing possible implementations, in another possible implementation, the receiver is specifically configured to:

receive an uplink message sent by the UE, where the uplink message is used to notify the network device that the primary core carrier is changed; and the processor is further configured to: after the receiver receives the notification that the primary core carrier of the UE is changed, determine, according to the uplink message received by the receiver, that the primary core carrier is changed.

With reference to the fifth aspect and the foregoing possible implementations, in another possible implementation, the receiver is specifically configured to:

receive an SR that is sent by the UE based on one secondary core carrier supporting a scheduling request SR function;

allocate an uplink resource to the UE; and receive the uplink message that is sent by the UE by using the uplink resource.

With reference to the fifth aspect and the foregoing possible implementations, in another possible implementation, when the multiple component carriers include at least two core carriers, the processor is further configured to: after the configuring a carrier aggregation model for user equipment UE, configure a measurement event for the UE, where the measurement event is used to instruct, when signal quality or signal strength of a neighboring cell is greater than signal quality or signal strength of a cell corresponding to any one of the core carriers, the UE to report a measurement report to the network device.

According to a sixth aspect of the present invention, user equipment is provided, including:

a receiver, configured to receive a carrier aggregation model sent by a network device; and a transmitter, configured to perform data transmission with the network device according to the carrier aggregation model received by the receiver, where the carrier aggregation model includes multiple component carriers, the multiple component carriers include at least one core carrier, and the at least one core carrier includes at least one primary core carrier; the core carrier has an uplink transmission function and a downlink transmission function, the uplink transmission function includes at least one of the following: an uplink feedback function corresponding to downlink data, a downlink channel state feedback function, or an uplink data transmission function, and the downlink transmission function includes at least one of the following: a downlink feedback function corresponding to uplink data, an uplink channel state feedback function, or a downlink data transmission function; and the primary core carrier has at least one of the following functions: a system message bearing function, a paging message bearing function, a semi-static scheduling parameter configuration function, a camping reference function, or an encryption reference function.

With reference to the sixth aspect, in a possible implementation, when the multiple component carriers include at least two core carriers, the receiver is further configured to: after the receiving a carrier aggregation model sent by a network device, receive a primary core carrier change notification message sent by the network device; and the user equipment further includes:

a processor, configured to change the primary core carrier to a new primary core carrier according to the primary core carrier change notification message received by the receiver.

With reference to the sixth aspect and the foregoing possible implementation, in another possible implementation, the processor is further configured to: after the changing the primary core carrier to a new primary core carrier according to the primary core carrier change notification message, trigger a random access channel RACH procedure, so that the network device determines, according to the RACH procedure, that the primary core carrier is successfully changed.

With reference to the sixth aspect and the foregoing possible implementations, in another possible implementation, the primary core carrier change notification message includes a dedicated preamble sequence; and the processor is further configured to: after the changing the primary core carrier to a new primary core carrier according to the primary core carrier change notification message, trigger a RACH procedure by using the dedicated preamble sequence and based on an uplink carrier corresponding to the new primary core carrier, so that the network device determines, according to the dedicated preamble sequence, that the primary core carrier is successfully changed.

With reference to the sixth aspect and the foregoing possible implementations, in another possible implementation, when the multiple component carriers include at least two core carriers, the processor is further configured to: after the receiver receives the carrier aggregation model sent by the network device, determine to change the primary core carrier, and determine a new primary core carrier from a secondary core carrier, where the secondary core carrier is a core carrier other than the primary core carrier among the at least two core carriers; and the transmitter is further configured to notify the network device that the primary core carrier is changed.

With reference to the sixth aspect and the foregoing possible implementations, in another possible implementation, the transmitter is specifically configured to:

trigger, based on an uplink carrier corresponding to the new primary core carrier, a RACH procedure, so that the network device determines, according to the RACH procedure, that the primary core carrier is changed.

With reference to the sixth aspect and the foregoing possible implementations, in another possible implementation, the transmitter is specifically configured to:

send an uplink message to the network device, so that the network device determines, according to the uplink message, that the primary core carrier is changed, where the uplink message is used to notify the network device that the primary core carrier is changed.

With reference to the sixth aspect and the foregoing possible implementations, in another possible implementation, the transmitter is specifically configured to:

send, based on one secondary core carrier supporting a scheduling request SR function, an SR to the network device;

receive an uplink resource allocated by the network device to the UE; and send the uplink message to the network device by using the uplink resource.

With reference to the sixth aspect and the foregoing possible implementations, in another possible implementation, the processor is specifically configured to:

when determining that a primary core link fails, determine to change the primary core carrier.

With reference to the sixth aspect and the foregoing possible implementations, in another possible implementation, the processor is specifically configured to:

determine the new primary core carrier from the secondary core carrier according to a preset rule, where the preset rule includes at least one of the following: a preset order, quality of a signal transmitted based on the secondary core carrier, or a cell identity corresponding to the secondary core carrier.

With reference to the sixth aspect and the foregoing possible implementations, in another possible implementation, when the multiple component carriers include at least two core carriers, the receiver is further configured to: after the receiving a carrier aggregation model sent by a network device, receive a measurement event sent by the network device; and the processor is further configured to determine, according to the measurement event received by the receiver, to report a measurement report to the network device when signal quality or signal strength of a neighboring cell is greater than signal quality or signal strength of a cell corresponding to any one of the core carriers.

According to the carrier configuration method and the device that are provided in the present invention, a network device configures a carrier aggregation model for UE, so that the UE performs data transmission with the network device according to the carrier aggregation model, where the carrier aggregation model includes multiple component carriers, the multiple component carriers include at least one core carrier, and the at least one core carrier includes at least one primary core carrier. By configuring for UE a carrier aggregation model that includes at least one core carrier, an ordinary secondary component carrier and an important secondary component carrier can be distinguished, and the important secondary component carrier is also used as a core carrier. This not only helps management of the important secondary component carrier, but also provides the UE with more options of core carriers.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 1 is a flowchart of a carrier configuration method according to an embodiment of the present invention;

FIG. 2 is a flowchart of a carrier configuration method according to another embodiment of the present invention;

DESCRIPTION OF EMBODIMENTS

Figure 3:
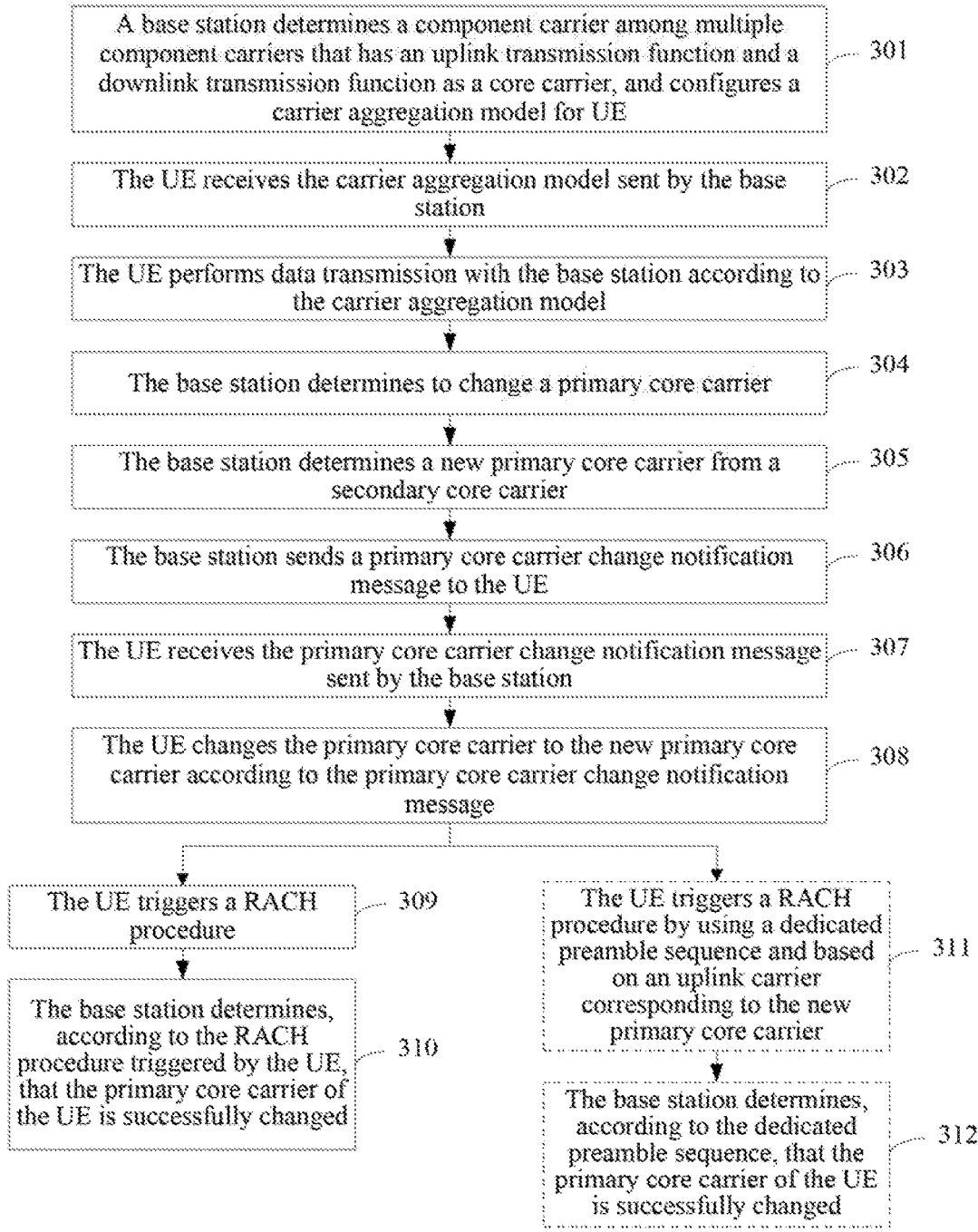
FIG. 3 is a flowchart of a carrier configuration method according to another embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Technologies described in this specification may be applied to various communications systems, for example, current 2G and 3G communications systems and next-generation communications systems, for example, a Global System for Mobile Communications (English: Global System for Mobile communications, GSM for short), a Code Division Multiple Access (English: Code Division Multiple Access, CDMA for short) system, a Time Division Multiple Access (English: Time Division Multiple Access, TDMA for short) system, a Wideband Code Division Multiple Access (English: Wideband Code Division Multiple Access Wireless, WCDMA for short) system, a Frequency Division Multiple Access (English: Frequency Division Multiple Addressing, FDMA for short) system, an Orthogonal Frequency-Division Multiple Access (English: Orthogonal Frequency-Division Multiple Access, OFDMA for short) system, a single-carrier FDMA (SC-FDMA) system, a General Packet Radio Service (English: General Packet Radio Service. GPRS for short) system, a Long Term Evolution (English: Long Term Evolution, LTE for short) system, and other communications systems.

Various aspects are described in this specification with reference to a terminal and/or a base station and/or a base station node.

User equipment may be a wireless terminal or a wired terminal. The wireless terminal may be a device that provides a user with voice and/or data connectivity, a handheld device with a radio connection function, or another processing device connected to a radio modem. The wireless terminal may communicate with one or more core networks by using a radio access network (English: Radio Access Network, RAN for short). The wireless terminal may be a mobile terminal, such as a mobile phone (also referred to as a "cellular" phone) and a computer provided with a mobile terminal, for example, may be a portable, pocket-sized, handheld, computer built-in, or in-vehicle mobile apparatus, which exchanges voice and/or data with the radio access network. For example, it may be a device such as a personal communication service (English: Personal Communication Service, PCS for short) phone, a cordless telephone set, a Session Initiation Protocol (English: Session Initiation Protocol, SIP for short) phone, a wireless local loop (English: Wireless Local Loop, WLL for short) station, or a personal digital assistant (English: Personal Digital Assistant, PDA for short). The wireless terminal may also be called a system, a subscriber unit (Subscriber Unit), a subscriber station (Subscriber Station), a mobile station (Mobile Station), a mobile terminal (Mobile), a remote station (Remote Station), an access point (Access Point), a remote terminal (Remote Terminal), an access terminal (Access Terminal), a user terminal (User Terminal), a user agent (User Agent), or user equipment (User Equipment).

The base station (for example, an access point) may be a device in communication with a wireless terminal via one or more sectors over an air interface in an access network. The base station may be configured to convert a received over-the-air frame to an IP packet or convert a received IP packet to an over-the-air frame, and serve as a router between the wireless terminal and a rest portion of the access network, where the rest portion of the access network may include an Internet protocol (English: Internet Protocol, IP for short) network. The base station may coordinate attribute management of the air interface. For example, the base station may be a base transceiver station (English: Base Transceiver Station, BTS for short) in GSM or CDMA, may be a NodeB (NodeB) in WCDMA, or may be an evolved NodeB (evolutional Node B, NodeB, eNB, or e-NodeB) in LTE, which is not limited in this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In addition, a network device herein may be a base station, a base station controller, or another network side device having a function of communicating with user equipment.

An embodiment of the present invention provides a carrier configuration method. As shown in FIG. 1, the method may include the following step.

101. A network device configures a carrier aggregation model for UE, so that the UE performs data transmission with the network device according to the carrier aggregation model.

The carrier aggregation model configured by the network device for the UE includes multiple component carriers, the multiple component carriers include at least one core carrier, and the at least one core carrier includes at least one primary core carrier. That is, the multiple component carriers included in the carrier aggregation model may include one core carrier, or may include at least two core carriers. In addition, when the multiple component carriers include one core carrier, the core carrier is a primary core carrier; when the multiple component carriers include at least two core carriers, the at least two core carriers may include at least one primary core carrier.

The core carrier in this embodiment of the present invention has an uplink transmission function and a downlink transmission function. The uplink transmission function includes at least one of the following: an uplink feedback function corresponding to downlink data, a downlink channel state feedback function, or an uplink data transmission function. The downlink transmission function includes at least one of the following: a downlink feedback function corresponding to uplink data, an uplink channel state feedback function, or a downlink data transmission function. A non-core carrier, that is, a carrier other than the core carrier among the multiple component carriers included in the carrier aggregation model has the uplink transmission function and/or the downlink transmission function. The primary core carrier in this embodiment of the present invention has at least one of the following functions: a system message bearing function, a paging message bearing function, a semi-static scheduling parameter configuration function, a camping reference function, or an encryption reference function. Specifically, the camping reference function means that the UE camps on a cell corresponding to the primary core carrier, and when performing location update, reports a location by using the cell corresponding to the primary core carrier as a serving cell. The encryption reference function means that the network device and the UE perform encryption according to a cell identity of the serving cell corresponding to the primary core carrier.

For example, a carrier aggregation model configured by the network device for the UE includes 6 component carriers: CC0, CC1, CC2, CC3, CC4, and CC5. Both CC0 and CC1 are core carriers, and each has the uplink transmission function and the downlink transmission function. CC1 is a primary core carrier. The rest component carriers CC2, CC3, CC4, and CC5 are all non-core carriers, and each has the uplink transmission function and/or the downlink transmission function. In this case, after the network device configures the aggregation carrier model for the UE, the UE may camp on a cell corresponding to CC1, read a system broadcast of the cell corresponding to CC1, receive a paging message and the like from the cell corresponding to CC1, and perform data transmission with the network device by using a carrier aggregation technology and based on CC0, CC1, CC2, CC3, CC4, and CC5.

According to the carrier configuration method provided in this embodiment of the present invention, a network device configures a carrier aggregation model for UE, so that the UE performs data transmission with the network device according to the carrier aggregation model, where the carrier aggregation model includes multiple component carriers, the multiple component carriers include at least one core carrier, and the at least one core carrier includes at least one primary core carrier. By configuring for UE a carrier aggregation model that includes at least one core carrier, an ordinary secondary component carrier and an important secondary component carrier can be distinguished, and the important secondary component carrier is also used as a core carrier. This not only helps management of the important secondary component carrier, but also provides the UE with more options of core carriers.

Further, before performing step 101, the network device may determine a component carrier among the multiple component carriers that has the uplink transmission function and the downlink transmission function as the core carrier.

The network device may directly determine a component carrier among a secondary component carrier (the secondary component carrier is a component carrier other than a primary component carrier among the multiple component carriers; the primary component carrier is also one of the core carriers in this embodiment of the present invention, and the primary component carrier is designated in advance) included in the multiple component carriers that has the uplink transmission function and the downlink transmission function as the core carrier.

Certainly, after determining the component carrier that has the uplink transmission function and the downlink transmission function, further, the network device may also determine, from the component carrier having the uplink transmission function and the downlink transmission function, a component carrier whose channel quality is better than a preset threshold as the core carrier, or determine, from the component carrier having the uplink transmission function and the downlink transmission function, a component carrier whose channel quality is relatively good as the core carrier.

Further, to improve stability of communication between the UE and the network device, when the multiple component carriers include at least two core carriers, in a first possible implementation, the network device may actively trigger a primary core carrier change. Specifically, after step 101, the network device may determine to change the primary core carrier, determine a new primary core carrier from a secondary core carrier, and may send a primary core carrier change notification message to the UE, so that the UE changes the primary core carrier to the new primary core carrier.

The determining, by the network device, to change the primary core carrier may specifically include: determining to change the primary core carrier when the network device determines, according to a measurement report of the UE, that channel quality of the secondary core carrier is better than channel quality of the current primary core carrier, which may be updating the secondary core carrier whose channel quality is determined, according to the measurement report, to be better than the channel quality of the current primary core carrier, as the primary core carrier; or determining to change the primary core carrier when the network device determines that load of a cell corresponding to the current primary core carrier is relatively high.

The secondary core carrier is a core carrier other than the primary core carrier among the at least two core carriers. The primary core carrier change notification message is used to instruct the UE to change the primary core carrier.

For example, if the multiple component carriers include two core carriers, the determining, by the network device, a new primary core carrier from a secondary core carrier may be specifically: using, directly by the network device, a secondary core carrier other than the current primary core carrier as the new primary core carrier, and sending the primary core carrier change notification message to the UE. In this way, because the multiple component carriers include only two core carriers, after receiving the primary core carrier change notification message sent by the network device, the UE may change the secondary core carrier other than the current primary core carrier among the two core carriers as the new primary core carrier. If the multiple component carriers include three or more core carriers, the determining, by the network device, a new primary core carrier from a secondary core carrier may be specifically: determining, by the network device, the new primary core carrier from the secondary core carriers according to the channel quality of the secondary core carriers or load statuses of cells corresponding to the secondary core carriers, and sending, to the UE, the primary core carrier change notification message carrying an identifier of the new primary core carrier. In this way, after receiving the primary core carrier change notification message sent by the network device, the UE may change, according to the identifier carried in the primary core carrier change notification message, a secondary core carrier corresponding to the identifier as the new primary core carrier.

Further, the sending, by the network device, a primary core carrier change notification message to the UE may be specifically: sending, by the network device, the primary core carrier change notification message to the UE by using physical layer signaling or Medium Access Control MAC (English: Medium Access Control, MAC for short) layer signaling.

For example, the physical layer signaling may be a physical control channel command, and the MAC signaling may be a MAC control unit.

Further, after sending the primary core carrier change notification message to the UE, the network device may determine, according to a random access channel (English: Random Access channel, RACH for short) procedure triggered by the UE, that the primary core carrier of the UE is successfully changed.

For example, the RACH procedure triggered by the UE is specifically a contention-based RACH procedure that may specifically include: the UE determines a preamble sequence, and sends the preamble sequence to the network device; the network device sends acknowledgement information to the UE after receiving the preamble sequence, where the acknowledgement information is used to indicate an uplink grant to be used in subsequent transmission and/or adjust uplink sending timing of the UE; the UE sends, to the network device according to the uplink grant, an uplink data unit carrying identifier information of the UE; and the network device determines, according to the uplink data unit carrying the identifier information of the UE, the UE corresponding to the preamble sequence received previously, and sends, to the UE, a grant or a downlink data unit that carries an identifier of the UE, so that the UE determines that the network device has received the uplink data unit. The network device may determine, according to the received uplink data unit sent by the UE and carrying the identifier of the UE, that the primary core carrier of the UE is successfully changed.

Further, the primary core carrier change notification message sent by the network device to the UE may include a dedicated preamble sequence.

Further, when the primary core carrier change notification message sent by the network device to the UE includes a dedicated preamble sequence, after sending the primary core carrier change notification message to the UE, the network device may determine, according to a RACH procedure triggered by the UE by using the dedicated preamble sequence and based on an uplink carrier corresponding to the new primary core carrier, that the primary core carrier of the UE is successfully changed.

For example, the RACH procedure triggered by the UE by using the dedicated preamble sequence is specifically a non-contention-based RACH procedure that may specifically include: the UE sends, based on the uplink carrier corresponding to the new primary core carrier, the dedicated preamble sequence to the network device; and after receiving the dedicated preamble sequence, the network device sends acknowledgement information to the UE, where the acknowledgement information is used to indicate an uplink grant to be used in subsequent transmission and/or adjust uplink sending timing of the UE. The network device may determine, according to the received dedicated preamble sequence sent by the UE, that the primary core carrier of the UE is successfully changed.

Further, to improve stability of communication between the UE and the network device, when the multiple component carriers include at least two core carriers, in a second possible implementation, the UE may actively trigger a primary core carrier change. In this case, after step 101, the network device receives a notification that the primary core carrier of the UE is changed.

Further, in a possible implementation, the receiving, by the network device, a notification that the primary core carrier of the UE is changed may be specifically: receiving, by the network device, a RACH procedure that is triggered by the UE based on an uplink carrier corresponding to the new primary core carrier. In this way, after receiving the notification that the primary core carrier of the UE is changed, the network device may determine, according to the RACH procedure, that the primary core carrier is changed.

Further, in another possible implementation, the receiving, by the network device, a notification that the primary core carrier of the UE is changed may be specifically: receiving, by the network device, an uplink message sent by the UE, where the uplink message is used to notify the network device that the primary core carrier is changed. In this way, after receiving the notification that the primary core carrier of the UE is changed, the network device determines, according to the uplink message, that the primary core carrier is changed.

Further, the receiving, by the network device, an uplink message sent by the UE may be specifically: receiving, by the network device, a scheduling request (English: Scheduling Request, SR for short) that is sent by the UE based on one secondary core carrier supporting an SR function; and allocating an uplink resource to the UE. In this case, the network device may receive the uplink message that is sent by the UE by using the uplink resource allocated to the UE.

Further, when the multiple component carriers include at least two core carriers, after step 101, the network device may configure a measurement event for the UE, where the measurement event is used to instruct, when signal quality or signal strength of a neighboring cell is greater than signal quality or signal strength of a cell corresponding to any one of the core carriers, the UE to report a measurement report to the network device.

After receiving the measurement event sent by the base station, the UE may measure the signal quality or the signal strength of the neighboring cell, and determine, according to the received measurement event, to report the measurement report to the base station when the signal quality or the signal strength of the neighboring cell is greater than the signal quality or the signal strength of the cell corresponding to any one of the core carriers, where the measurement report is to serve as a basis for the base station to determine whether the core carrier needs to be changed.

Another embodiment of the present invention provides a carrier configuration method. As shown in FIG. 2, the method may include the following steps.

201. UE receives a carrier aggregation model sent by a network device.

The carrier aggregation model may include multiple component carriers, the multiple component carriers include at least one core carrier, and the at least one core carrier includes at least one primary core carrier.

The core carrier in this embodiment of the present invention has an uplink transmission function and a downlink transmission function. The uplink transmission function includes at least one of the following: an uplink feedback function corresponding to downlink data, a downlink channel state feedback function, or an uplink data transmission function. The downlink transmission function includes at least one of the following: a downlink feedback function corresponding to uplink data, an uplink channel state feedback function, or a downlink data transmission function. A non-core carrier, that is, a carrier other than the core carrier among the multiple component carriers included in the carrier aggregation model has the uplink transmission function and/or the downlink transmission function. The primary core carrier in this embodiment of the present invention has at least one of the following functions: a system message bearing function, a paging message bearing function, a semi-static scheduling parameter configuration function, a camping reference function, or an encryption reference function. Specifically, the camping reference function means that the UE camps on a cell corresponding to the primary core carrier, and when performing location update, reports a location by using the cell corresponding to the primary core carrier as a serving cell. The encryption reference function means that the network device and the UE perform encryption according to a cell identity of the serving cell corresponding to the primary core carrier.

202. The UE performs data transmission with the network device according to the carrier aggregation model.

According to the carrier configuration method provided in this embodiment of the present invention, UE receives a carrier aggregation model sent by a network device, and performs data transmission with the network device according to the carrier aggregation model, where the carrier aggregation model includes multiple component carriers, the multiple component carriers include at least one core carrier, and the at least one core carrier includes at least one primary core carrier. By configuring for UE a carrier aggregation model that includes at least one core carrier, an ordinary secondary component carrier and an important secondary component carrier can be distinguished, and the important secondary component carrier is also used as a core carrier. This not only helps management of the important secondary component carrier, but also provides the UE with more options of core carriers.

Further, to improve stability of communication between the UE and the network device, when the multiple component carriers include at least two core carriers, in a first possible implementation, the network device may actively trigger a primary core carrier change. Specifically, after step 201, the UE may receive a primary core carrier change notification message sent by the network device, and changes the primary core carrier to a new primary core carrier according to the received primary core carrier change notification message.

Optionally, the UE may receive the primary core carrier change notification message sent by the network device and by using physical layer signaling or MAC layer signaling.

Further, to enable the network device to learn that the primary core carrier of the UE is successfully changed, after changing the primary core carrier to the new primary core carrier according to the primary core carrier change notification message, the UE may trigger a RACH procedure, so that the network device determines, according to the RACH procedure, that the primary core carrier is successfully changed.

Further, the primary core carrier change notification message sent by the network device and received by the UE may include a dedicated preamble sequence.

In this scenario, to enable the network device to learn that the primary core carrier of the UE is successfully changed, after changing the primary core carrier to the new primary core carrier according to the primary core carrier change notification message, the UE may trigger a RACH procedure by using the dedicated preamble sequence included in the primary core carrier change notification message and based on an uplink carrier corresponding to the new primary core carrier, so that the network device determines, according to the dedicated preamble sequence, that the primary core carrier is successfully changed.

Further, to improve stability of communication between the UE and the network device, when the multiple component carriers include at least two core carriers, in a second possible implementation, the UE may actively trigger a primary core carrier change. Specifically, after step 201, the UE may determine whether to change the primary core carrier, and if the UE determines to change the primary core carrier, the UE determines a new primary core carrier from a secondary core carrier, and notifies the network device that the primary core carrier is changed.

The determining, by the UE, whether to change the primary core carrier may specifically include: determining, by the UE, that the current primary core carrier fails or channel quality of a secondary core carrier is better than channel quality of the current primary core carrier. That the primary core carrier fails may include that channel quality of the primary core carrier is continuously lower than a preset threshold.

The secondary core carrier is a core carrier other than the primary core carrier among the at least two core carriers.

For example, if the multiple component carriers include two core carriers, the determining, by the UE, a new primary core carrier from a secondary core carrier may be specifically: using, directly by the UE, the secondary core carrier other than the current primary core carrier among the two core carriers as the new primary core carrier, and notifying the network device that the primary core carrier is changed. If the multiple component carriers include three or more core carriers, the determining, by the UE, a new primary core carrier from a secondary core carrier may be specifically: determining, by the UE according to a preset rule, the new primary core carrier from the secondary core carriers, and notifying the network device that the primary core carrier is changed.

Further, the preset rule may include at least one of the following: a preset order, quality of a signal transmitted based on the secondary core carrier, or a cell identity corresponding to the secondary core carrier.

Further, in a possible implementation, the notifying, by the UE, the network device that the primary core carrier is changed may be specifically: triggering, by the UE based on an uplink carrier corresponding to the new primary core carrier, a RACH procedure, so that the network device determines, according to the RACH procedure, that the primary core carrier is changed.

Further, in another possible implementation, the notifying, by the UE, the network device that the primary core carrier is changed may be specifically: sending, by the UE, an uplink message to the network device, so that the network device determines, according to the uplink message, that the primary core carrier is changed.

The uplink message is used to notify the network device that the primary core carrier is changed.

Further, the sending, by the UE, an uplink message to the network device may be specifically: sending, by the UE based on one secondary core carrier supporting an SR function, an SR to the network device, so that the network device allocates an uplink resource to the UE. In this case, the UE may receive the uplink resource allocated by the network device to the UE, and send the uplink message to the network device by using the uplink resource.

Further, in a possible implementation, the determining, by the UE, to change the primary core carrier may be specifically: determining, by the UE when determining that a primary core link fails, to change the primary core carrier.

Further, when the multiple component carriers include at least two core carriers, after step 201, the UE may receive a measurement event sent by the network device, and determine, according to the measurement event, to report a measurement report to the network device when signal quality or signal strength of a neighboring cell is greater than signal quality or signal strength of a cell corresponding to any one of the core carriers.

Another embodiment of the present invention provides a carrier configuration method. When a carrier aggregation model configured by a network device for UE includes multiple component carriers, the multiple component carriers include at least two core carriers, and the at least two core carriers include at least one primary core carrier, to improve stability of communication between the UE and the network device, the network device or the UE may trigger a primary core carrier change, so that when the current primary core carrier fails, communication can be continued by using a changed-to primary core carrier. For ease of understanding by a person skilled in the art, specific implementation processes of the present invention are described in detail for different application scenarios in the present invention. An example in which a network device is a base station is used.

In a first application scenario, a base station actively triggers a primary core carrier change. As shown in FIG. 3, a carrier configuration method in this scenario may include the following steps.

301. A base station determines a component carrier among multiple component carriers that has an uplink transmission function and a downlink transmission function as a core carrier, and configures a carrier aggregation model for UE.

302. The UE receives the carrier aggregation model sent by the base station.

For example, a carrier aggregation model configured by the base station for the UE includes 6 component carriers: CC0, CC1, CC2, CC3, CC4, and CC5. CC0, CC1, and CC5 are all core carriers, and each has the uplink transmission function and the downlink transmission function. CC1 is a primary core carrier. The rest component carriers CC2, CC3, and CC4 are all non-core carriers, and each has the uplink transmission function and/or the downlink transmission function.

303. The UE performs data transmission with the base station according to the carrier aggregation model.

After receiving the carrier aggregation model sent by the base station, the UE may perform data transmission with the base station according to the carrier aggregation model.

Specifically, after the base station configures, for the UE, the aggregation carrier model exemplified in step 302, the UE may camp on a cell corresponding to CC1, and may read a system broadcast of the cell corresponding to CC1, may further receive a paging message and the like from the cell corresponding to CC1, and may perform data transmission with the network device by using a carrier aggregation technology and based on CC0, CC1, CC2, CC3, CC4, and CC5.

304. The base station determines to change a primary core carrier.

After the UE receives the carrier aggregation model sent by the base station, to ensure reliability of communication with the UE, the base station may determine whether the primary core carrier needs to be changed, and performs the following step 305 to step 312 after determining that the primary core carrier needs to be changed.

305. The base station determines a new primary core carrier from a secondary core carrier.

The secondary core carrier is a core carrier other than the primary core carrier among the at least two core carriers. Specifically, after determining that the primary core carrier needs to be changed, the base station may determine the new primary core carrier from the core carrier other than the primary core carrier among the at least two core carriers. Based on the example in step 302, the base station may determine one core carrier from CC0 and CC5 as the new primary core carrier.

306. The base station sends a primary core carrier change notification message to the UE.

The primary core carrier change notification message is used to instruct the UE to change the primary core carrier. After determining the new primary core carrier from the secondary core carrier, the base station may send the primary core carrier change notification message to the UE.

For example, if the new primary core carrier determined by the base station in step 305 is CC5, in this case, the base station may send, to the UE, the primary core carrier change notification message carrying an identifier of CC5. Certainly, if the carrier aggregation model configured by the base station for the UE includes only two core carriers: CC1 and CC5, the primary core carrier change notification message sent by the base station to the UE may not carry the identifier of the determined new primary core carrier (CC5).

Further, optionally, the base station may send the primary core carrier change notification message to the UE by using physical layer signaling or MAC layer signaling.

307. The UE receives the primary core carrier change notification message sent by the base station.

308. The UE changes the primary core carrier to the new primary core carrier according to the primary core carrier change notification message.

After receiving the primary core carrier change notification message sent by the base station, the UE may change the primary core carrier to the new primary core carrier according to the primary core carrier change notification message.

For example, according to the example in step 306, in this case, the UE may change the primary core carrier from CC1 to CC5 according to the identifier of CC5 carried in the received primary core carrier change notification message. After the change is complete, the UE may camp on a cell corresponding to CC5, may read a system broadcast from the cell corresponding to CC5, and may further receive a paging message and the like from the cell corresponding to CC5.

To enable the base station to learn that the primary core carrier of the UE is successfully changed, after performing step 308 of changing, by the UE, the primary core carrier to the new primary core carrier according to the primary core carrier change notification message, if the primary core carrier change notification message does not include a dedicated preamble sequence, step 309 and step 310 may be performed, or if the primary core carrier change notification message includes a dedicated preamble sequence, step 311 and step 312 may be performed.

309. The UE triggers a RACH procedure.

310. The base station determines, according to the RACH procedure triggered by the UE, that the primary core carrier of the UE is successfully changed.

311. The UE triggers a RACH procedure by using a dedicated preamble sequence and based on an uplink carrier corresponding to the new primary core carrier.

312. The base station determines, according to the dedicated preamble sequence, that the primary core carrier of the UE is successfully changed.

It should be noted that, for detailed descriptions of step 301 to step 312 in this embodiment of the present invention, reference may be made to other detailed descriptions of corresponding steps of the method embodiments in the present invention, and details are not described herein again in this embodiment of the present invention.

According to the carrier configuration method provided in this embodiment of the present invention, a base station configures a carrier aggregation model for UE, so that the UE performs data transmission with the base station according to the carrier aggregation model, where the carrier aggregation model includes multiple component carriers, the multiple component carriers include at least one core carrier, and the at least one core carrier includes at least one primary core carrier. By configuring for UE a carrier aggregation model that includes at least one core carrier, an ordinary secondary component carrier and an important secondary component carrier can be distinguished, and the important secondary component carrier is also used as a core carrier. This not only helps management of the important secondary component carrier, but also provides the UE with more options of core carriers.

In addition, when the multiple component carriers include at least two core carriers, the base station may actively trigger a primary core carrier change procedure when determining that the primary core carrier needs to be changed. Compared with the prior art in which UE releases all resources when a link failure occurs on a primary component carrier, leading to communication interruption, this improves stability of communication between the UE and the base station.

Figure 4:
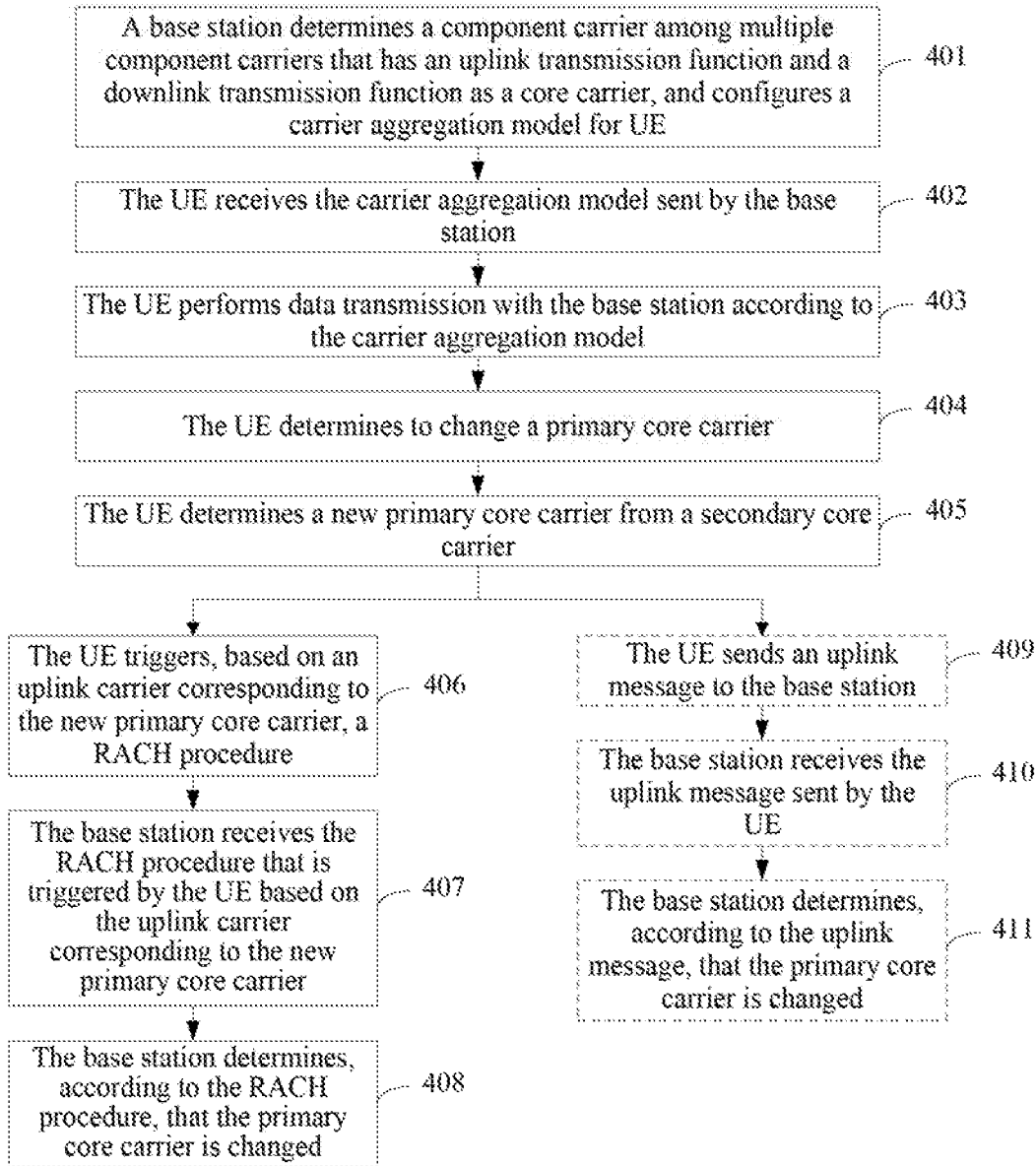
FIG. 4 is a flowchart of another carrier configuration method according to another embodiment of the present invention.

In a second application scenario, UE actively triggers a primary core carrier change. As shown in FIG. 4, a carrier configuration method in this scenario may include the following steps.

401. A base station determines a component carrier among multiple component carriers that has an uplink transmission function and a downlink transmission function as a core carrier, and configures a carrier aggregation model for UE.

402. The UE receives the carrier aggregation model sent by the base station.

403. The UE performs data transmission with the base station according to the carrier aggregation model.

404. The UE determines to change a primary core carrier.

After the UE receives the carrier aggregation model sent by the base station, to ensure reliability of communication with the UE, the UE may determine whether the primary core carrier needs to be changed, and performs the following step 405 to step 411 after determining that the primary core carrier needs to be changed.

For example, when determining that a primary core link fails, the UE determines that the primary core carrier needs to be changed. For example, the carrier aggregation model configured by the base station for the UE includes eight component carriers: CC0, CC1, CC2, CC3, CC4, CC5, CC6, and CC7. CC0, CC3, and CC4 are core carriers, and CC0 is the primary core carrier. When determining that a link failure occurs on CC0, the UE may determine that the primary core carrier needs to be changed.

405. The UE determines a new primary core carrier from a secondary core carrier.

The secondary core carrier is a core carrier other than the primary core carrier among the at least two core carriers.

Specifically, after determining that the primary core carrier needs to be changed, the base station may determine the new primary core carrier from the core carrier other than the primary core carrier among the at least two core carriers.

Optionally, in this embodiment of the present invention, the determining, by the UE, a new primary core carrier from a secondary core carrier may be specifically: determining, by the UE, the new primary core carrier from the secondary core carrier according to a preset rule, where the preset rule may include at least one of the following: a preset order, quality of a signal transmitted based on the secondary core carrier, or a cell identity corresponding to the secondary core carrier.

For example, based on the example in step 404, the UE may determine the new primary core carrier from CC3 and CC4. For example, signal quality of signal transmission based on CC3 is better than signal quality of signal transmission based on CC4, and the UE may determine CC3 as the new primary core carrier.

After determining the new primary core carrier from the secondary core carrier, the UE may notify the base station that the primary core carrier is changed. In a possible implementation, a specific notification process may include the following step 406 to step 408. In another possible implementation, a specific notification process may include the following step 409 to step 411.

406. The UE triggers, based on an uplink carrier corresponding to the new primary core carrier, a RACH procedure.

407. The base station receives the RACH procedure that is triggered by the UE based on the uplink carrier corresponding to the new primary core carrier.

408. The base station determines, according to the RACH procedure, that the primary core carrier is changed.

409. The UE sends an uplink message to the base station.

The uplink message is used to notify the base station that the primary core carrier is changed.

Specifically, the sending, by the UE, the uplink message to the base station may include the following step 409a1 to step 409a4.

409a1. The UE sends, based on one secondary core carrier supporting an SR function, an SR to the base station.

The secondary core carrier is a core carrier other than the current primary core carrier. For example, based on the example in step 404, the UE may select one secondary core carrier supporting an SR function from CC3 and CC4, where, for example, CC4 supports the SR function, and sends, based on CC4, an SR to the base station to trigger an uplink grant request.

409a2. The base station allocates an uplink resource to the UE.

After the UE sends, based on the secondary core carrier supporting the SR function, the SR to the base station, the base station may allocate the uplink resource to the UE according to the received SR, for the UE to transmit an uplink message.

409a3. The UE receives the uplink resource allocated by the base station to the UE.

409a4. The UE sends an uplink message to the base station by using the uplink resource.

410. The base station receives the uplink message sent by the UE.

411. The base station determines, according to the uplink message, that the primary core carrier is changed.

It should be noted that, for detailed descriptions of step 401 to step 411 in this embodiment of the present invention, reference may be made to other detailed descriptions of corresponding steps of the method embodiments in the present invention, and details are not described herein again in this embodiment of the present invention.

According to the carrier configuration method provided in this embodiment of the present invention, a base station configures a carrier aggregation model for UE, so that the UE performs data transmission with the base station according to the carrier aggregation model, where the carrier aggregation model includes multiple component carriers, the multiple component carriers include at least one core carrier, and the at least one core carrier includes at least one primary core carrier. By configuring for UE a carrier aggregation model that includes at least one core carrier, an ordinary secondary component carrier and an important secondary component carrier can be distinguished, and the important secondary component carrier is also used as a core carrier. This not only helps management of the important secondary component carrier, but also provides the UE with more options of core carriers.

In addition, when the multiple component carriers include at least two core carriers, the UE may actively trigger a primary core carrier change procedure when determining that the primary core carrier needs to be changed. Compared with the prior art in which UE releases all resources when a link failure occurs on a primary component carrier, leading to communication interruption, this improves stability of communication between the UE and the base station.

Figure 5:
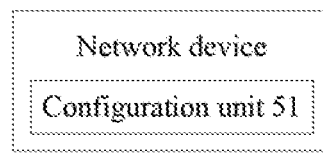
FIG. 5 is a schematic composition diagram of a network device according to another embodiment of the present invention.

Another embodiment of the present invention provides a network device. As shown in FIG. 5, the network device may include a configuration unit 51.

The configuration unit 51 is configured to configure a carrier aggregation model for user equipment UE, so that the UE performs data transmission with a network device according to the carrier aggregation model.

The carrier aggregation model includes multiple component carriers, the multiple component carriers include at least one core carrier, and the at least one core carrier includes at least one primary core carrier, the core carrier has an uplink transmission function and a downlink transmission function, the uplink transmission function includes at least one of the following: an uplink feedback function corresponding to downlink data, a downlink channel state feedback function, or an uplink data transmission function, and the downlink transmission function includes at least one of the following: a downlink feedback function corresponding to uplink data, an uplink channel state feedback function, or a downlink data transmission function; and the primary core carrier has at least one of the following functions: a system message bearing function, a paging message bearing function, a semi-static scheduling parameter configuration function, a camping reference function, or an encryption reference function.

Figure 6:
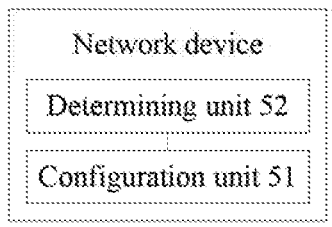
FIG. 6 is a schematic composition diagram of another network device according to another embodiment of the present invention.

In this embodiment of the present invention, further, as shown in FIG. 6, the network device may further include a determining unit 52.

The determining unit 52 is configured to: before the configuration unit 51 configures the carrier aggregation model for the user equipment UE, determine a component carrier among the multiple component carriers that has the uplink transmission function and the downlink transmission function as the core carrier.

In this embodiment of the present invention, further, when the multiple component carriers include at least two core carriers, the determining unit 52 is further configured to: after the configuration unit 51 configures the carrier aggregation model for the user equipment UE, determine to change the primary core carrier, and determine a new primary core carrier from a secondary core carrier, where the secondary core carrier is a core carrier other than the primary core carrier among the at least two core carriers.

Figure 7:
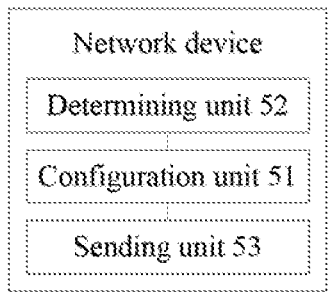
FIG. 7 is a schematic composition diagram of another network device according to another embodiment of the present invention.

As shown in FIG. 7, the network device may further include a sending unit 53.

The sending unit 53 is configured to send a primary core carrier change notification message to the UE, so that the UE changes the primary core carrier to the new primary core carrier, where the primary core carrier change notification message is used to instruct the UE to change the primary core carrier.

In this embodiment of the present invention, further, the sending unit 53 is specifically configured to send the primary core carrier change notification message to the UE by using physical layer signaling or Medium Access Control MAC layer signaling.

In this embodiment of the present invention, further, the determining unit 52 is further configured to: after the sending unit 53 sends the primary core carrier change notification message to the UE, determine, according to a random access channel RACH procedure triggered by the UE, that the primary core carrier of the UE is successfully changed.

In this embodiment of the present invention, further, the primary core carrier change notification message includes a dedicated preamble sequence.

In this embodiment of the present invention, further, the determining unit 52 is further configured to: after the sending unit 53 sends the primary core carrier change notification message to the UE, determine, according to a RACH procedure triggered by the UE by using the dedicated preamble sequence and based on an uplink carrier corresponding to the new primary core carrier, that the primary core carrier of the UE is successfully changed.

Figure 8:
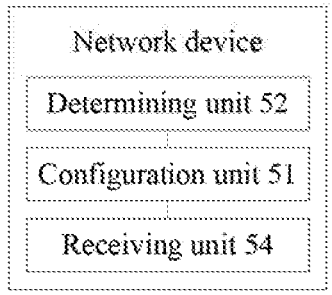
FIG. 8 is a schematic composition diagram of another network device according to another embodiment of the present invention.

In this embodiment of the present invention, further, when the multiple component carriers include at least two core carriers, as shown in FIG. 8, the network device may further include a receiving unit 54.

The receiving unit 54 is configured to: after the configuration unit 51 configures the carrier aggregation model for the user equipment UE, receive a notification that the primary core carrier of the UE is changed.

In this embodiment of the present invention, further, the receiving unit 54 is specifically configured to receive a RACH procedure that is triggered by the UE based on an uplink carrier corresponding to the new primary core carrier.

The determining unit 52 is further configured to: after the receiving unit 54 receives the notification that the primary core carrier of the UE is changed, determine, according to the RACH procedure, that the primary core carrier is changed.

In this embodiment of the present invention, further, the receiving unit 54 is specifically configured to receive an uplink message sent by the UE, where the uplink message is used to notify the network device that the primary core carrier is changed.

The determining unit 52 is further configured to: after the receiving unit 54 receives the notification that the primary core carrier of the UE is changed, determine, according to the uplink message received by the receiving unit 54, that the primary core carrier is changed.

In this embodiment of the present invention, further, the receiving unit 54 is specifically configured to: receive an SR that is sent by the UE based on one secondary core carrier supporting a scheduling request SR function, allocate an uplink resource to the UE, and receive the uplink message that is sent by the UE by using the uplink resource.

In this embodiment of the present invention, further, when the multiple component carriers include at least two core carriers, the configuration unit 51 is further configured to: after the configuring a carrier aggregation model for user equipment UE, configure a measurement event for the UE, where the measurement event is used to instruct, when signal quality or signal strength of a neighboring cell is greater than signal quality or signal strength of a cell corresponding to any one of the core carriers, the UE to report a measurement report to the network device.

It should be noted that, for a specific working process of each functional module of the network device provided in this embodiment of the present invention, reference may be made to detailed descriptions of a corresponding process in the method embodiments, and details are not described herein again in this embodiment of the present invention.

The network device provided in this embodiment of the present invention configures a carrier aggregation model for UE, so that the UE performs data transmission with the network device according to the carrier aggregation model, where the carrier aggregation model includes multiple component carriers, the multiple component carriers include at least one core carrier, and the at least one core carrier includes at least one primary core carrier. By configuring for UE a carrier aggregation model that includes at least one core carrier, an ordinary secondary component carrier and an important secondary component carrier can be distinguished, and the important secondary component carrier is also used as a core carrier. This not only helps management of the important secondary component carrier, but also provides the UE with more options of core carriers.

In addition, when the multiple component carriers include at least two core carriers, the base station may actively trigger a primary core carrier change procedure when determining that the primary core carrier needs to be changed. Compared with the prior art in which UE releases all resources when a link failure occurs on a primary component carrier, leading to communication interruption, this improves stability of communication between the UE and the base station.

Figure 9:
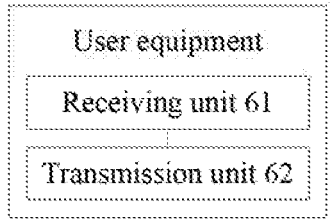
FIG. 9 is a schematic composition diagram of user equipment according to another embodiment of the present invention.

Another embodiment of the present invention provides user equipment. As shown in FIG. 9, the user equipment may include a receiving unit 61 and a transmission unit 62.

The receiving unit 61 is configured to receive a carrier aggregation model sent by a network device.

The transmission unit 62 is configured to perform data transmission with the network device according to the carrier aggregation model received by the receiving unit 61.

The carrier aggregation model includes multiple component carriers, the multiple component carriers include at least one core carrier, and the at least one core carrier includes at least one primary core carrier, the core carrier has an uplink transmission function and a downlink transmission function, the uplink transmission function includes at least one of the following: an uplink feedback function corresponding to downlink data, a downlink channel state feedback function, or an uplink data transmission function, and the downlink transmission function includes at least one of the following: a downlink feedback function corresponding to uplink data, an uplink channel state feedback function, or a downlink data transmission function; and the primary core carrier has at least one of the following functions: a system message bearing function, a paging message bearing function, a semi-static scheduling parameter configuration function, a camping reference function, or an encryption reference function.

In this embodiment of the present invention, further, when the multiple component carriers include at least two core carriers, the receiving unit 61 is further configured to: after the receiving a carrier aggregation model sent by a network device, receive a primary core carrier change notification message sent by the network device.

Figure 10:
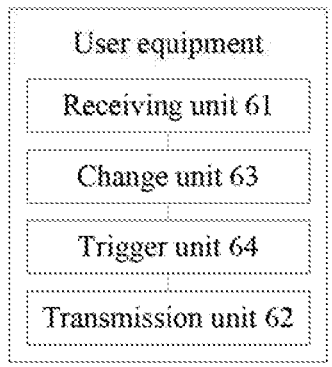
FIG. 10 is a schematic composition diagram of another user equipment according to another embodiment of the present invention.

As shown in FIG. 10, the user equipment may further include a change unit 63.

The change unit 63 is configured to change the primary core carrier to a new primary core carrier according to the primary core carrier change notification message received by the receiving unit 61.

In this embodiment of the present invention, further, the user equipment may further include a trigger unit 64.

The trigger unit 64 is configured to: after the change unit 63 changes the primary core carrier to the new primary core carrier according to the primary core carrier change notification message, trigger a random access channel RACH procedure, so that the network device determines, according to the RACH procedure, that the primary core carrier is successfully changed.

In this embodiment of the present invention, further, the primary core carrier change notification message includes a dedicated preamble sequence.

The trigger unit 64 is further configured to: after the change unit 63 changes the primary core carrier to the new primary core carrier according to the primary core carrier change notification message, trigger a RACH procedure by using the dedicated preamble sequence and based on an uplink carrier corresponding to the new primary core carrier, so that the network device determines, according to the dedicated preamble sequence, that the primary core carrier is successfully changed.

Figure 11:
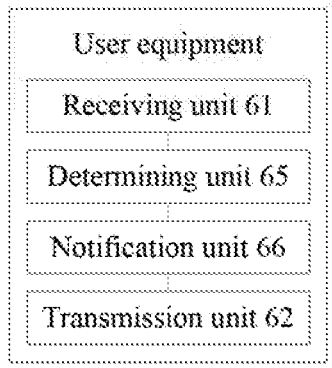
FIG. 11 is a schematic composition diagram of another user equipment according to another embodiment of the present invention.

In this embodiment of the present invention, further, when the multiple component carriers include at least two core carriers, as shown in FIG. 11, the user equipment may further include a determining unit 65 and a notification unit (6.

The determining unit 65 is configured to: after the receiving unit 61 receives the carrier aggregation model sent by the network device, determine to change the primary core carrier, and determine a new primary core carrier from a secondary core carrier, where the secondary core carrier is a core carrier other than the primary core carrier among the at least two core carriers.

The notification unit 66 is configured to notify the network device that the primary core carrier is changed.

In this embodiment of the present invention, further, the notification unit 66 is specifically configured to trigger, based on an uplink carrier corresponding to the new primary core carrier, a RACH procedure, so that the network device determines, according to the RACH procedure, that the primary core carrier is changed.

In this embodiment of the present invention, further, the notification unit 66 is specifically configured to send an uplink message to the network device, so that the network device determines, according to the uplink message, that the primary core carrier is changed, where the uplink message is used to notify the network device that the primary core carrier is changed.

In this embodiment of the present invention, further, the notification unit 66 is specifically configured to: send, based on one secondary core carrier supporting a scheduling request SR function, an SR to the network device; receive an uplink resource allocated by the network device to the UE; and send the uplink message to the network device by using the uplink resource.

In this embodiment of the present invention, further, the determining unit 65 is specifically configured to: when determining that a primary core link fails, determine to change the primary core carrier.

In this embodiment of the present invention, further, the determining unit 65 is specifically configured to: determine the new primary core carrier from the secondary core carrier according to a preset rule.

The preset rule includes at least one of the following: a preset order, quality of a signal transmitted based on the secondary core carrier, or a cell identity corresponding to the secondary core carrier.

In this embodiment of the present invention, further, when the multiple component carriers include at least two core carriers, the receiving unit 61 is further configured to: after the receiving a carrier aggregation model sent by a network device, receive a measurement event sent by the network device.

The determining unit 65 is further configured to determine, according to the measurement event received by the receiving unit 61, to report a measurement report to the network device when signal quality or signal strength of a neighboring cell is greater than signal quality or signal strength of a cell corresponding to any one of the core carriers.

It should be noted that, for a specific working process of each functional module of the user equipment provided in this embodiment of the present invention, reference may be made to specific descriptions of a corresponding process in the method embodiments, and details are not described herein again in this embodiment of the present invention.

The UE provided in this embodiment of the present invention receives a carrier aggregation model sent by a network device, and performs data transmission with the network device according to the carrier aggregation model, where the carrier aggregation model includes multiple component carriers, the multiple component carriers include at least one core carrier, and the at least one core carrier includes at least one primary core carrier. By configuring for UE a carrier aggregation model that includes at least one core carrier, an ordinary secondary component carrier and an important secondary component carrier can be distinguished, and the important secondary component carrier is also used as a core carrier. This not only helps management of the important secondary component carrier, but also provides the UE with more options of core carriers.

In addition, when the multiple component carriers include at least two core carriers, the base station may actively trigger a primary core carrier change procedure when determining that the primary core carrier needs to be changed. Compared with the prior art in which UE releases all resources when a link failure occurs on a primary component carrier, leading to communication interruption, this improves stability of communication between the UE and the base station.

Figure 12:
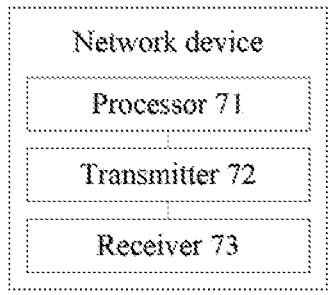
FIG. 12 is a schematic composition diagram of a network device according to another embodiment of the present invention.

Another embodiment of the present invention provides a network device. As shown in FIG. 12, the network device may include a processor 71.

The processor 71 is configured to configure a carrier aggregation model for user equipment UE, so that the UE performs data transmission with a network device according to the carrier aggregation model.

The carrier aggregation model includes multiple component carriers, the multiple component carriers include at least one core carrier, and the at least one core carrier includes at least one primary core carrier; the core carrier has an uplink transmission function and a downlink transmission function, the uplink transmission function includes at least one of the following: an uplink feedback function corresponding to downlink data, a downlink channel state feedback function, or an uplink data transmission function, and the downlink transmission function includes at least one of the following: a downlink feedback function corresponding to uplink data, an uplink channel state feedback function, or a downlink data transmission function; and the primary core carrier has at least one of the following functions: a system message bearing function, a paging message bearing function, a semi-static scheduling parameter configuration function, a camping reference function, or an encryption reference function.

In this embodiment of the present invention, further, the processor 71 is further configured to: before configuring the carrier aggregation model for the user equipment UE, determine a component carrier among the multiple component carriers that has the uplink transmission function and the downlink transmission function as the core carrier.

In this embodiment of the present invention, further, when the multiple component carriers include at least two core carriers, the processor 71 is further configured to: after the configuring a carrier aggregation model for user equipment UE, determine to change the primary core carrier, and determine a new primary core carrier from a secondary core carrier, where the secondary core carrier is a core carrier other than the primary core carrier among the at least two core carriers.

The network device may further include a transmitter 72.

The transmitter 72 is configured to send a primary core carrier change notification message to the UE, so that the UE changes the primary core carrier to the new primary core carrier, where the primary core carrier change notification message is used to instruct the UE to change the primary core carrier.

In this embodiment of the present invention, further, the transmitter 72 is specifically configured to send the primary core carrier change notification message to the UE by using physical layer signaling or Medium Access Control MAC layer signaling.

In this embodiment of the present invention, further, the processor 71 is further configured to: after the transmitter 72 sends the primary core carrier change notification message to the UE, determine, according to a random access channel RACH procedure triggered by the UE, that the primary core carrier of the UE is successfully changed.

In this embodiment of the present invention, further, the primary core carrier change notification message includes a dedicated preamble sequence.

In this embodiment of the present invention, further, the processor 71 is further configured to: after the transmitter 72 sends the primary core carrier change notification message to the UE, determine, according to a RACH procedure triggered by the UE by using the dedicated preamble sequence and based on an uplink carrier corresponding to the new primary core carrier, that the primary core carrier of the UE is successfully changed.

In this embodiment of the present invention, further, when the multiple component carriers include at least two core carriers, the network device may further include a receiver 73.

The receiver 73 is configured to: after the processor 71 configures the carrier aggregation model for the user equipment UE, receive a notification that the primary core carrier of the UE is changed.

In this embodiment of the present invention, further, the receiver 73 is specifically configured to receive a RACH procedure that is triggered by the UE based on an uplink carrier corresponding to the new primary core carrier.

The processor 71 is further configured to: after the receiver 73 receives the notification that the primary core carrier of the UE is changed, determine, according to the RACH procedure, that the primary core carrier is changed.

In this embodiment of the present invention, further, the receiver 73 is specifically configured to receive an uplink message sent by the UE, where the uplink message is used to notify the network device that the primary core carrier is changed.

The processor 71 is further configured to: after the receiver 73 receives the notification that the primary core carrier of the UE is changed, determine, according to the uplink message received by the receiver 73, that the primary core carrier is changed.

In this embodiment of the present invention, further, the receiver 73 is specifically configured to: receive an SR that is sent by the UE based on one secondary core carrier supporting a scheduling request SR function, allocate an uplink resource to the UE, and receive the uplink message that is sent by the UE by using the uplink resource.

In this embodiment of the present invention, further, when the multiple component carriers include at least two core carriers, the processor 71 is further configured to: after the configuring a carrier aggregation model for user equipment UE, configure a measurement event for the UE, where the measurement event is used to instruct, when signal quality or signal strength of a neighboring cell is greater than signal quality or signal strength of a cell corresponding to any one of the core carriers, the UE to report a measurement report to the network device.

It should be noted that, for a specific working process of each functional module of the network device provided in this embodiment of the present invention, reference may be made to detailed descriptions of a corresponding process in the method embodiments, and details are not described herein again in this embodiment of the present invention.

The network device provided in this embodiment of the present invention configures a carrier aggregation model for UE, so that the UE performs data transmission with the network device according to the carrier aggregation model, where the carrier aggregation model includes multiple component carriers, the multiple component carriers include at least one core carrier, and the at least one core carrier includes at least one primary core carrier. By configuring for UE a carrier aggregation model that includes at least one core carrier, an ordinary secondary component carrier and an important secondary component carrier can be distinguished, and the important secondary component carrier is also used as a core carrier. This not only helps management of the important secondary component carrier, but also provides the UE with more options of core carriers.

In addition, when the multiple component carriers include at least two core carriers, the base station may actively trigger a primary core carrier change procedure when determining that the primary core carrier needs to be changed. Compared with the prior art in which UE releases all resources when a link failure occurs on a primary component carrier, leading to communication interruption, this improves stability of communication between the UE and the base station.

Figure 13:
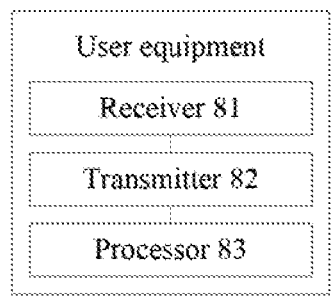
FIG. 13 is a schematic composition diagram of user equipment according to another embodiment of the present invention.

Another embodiment of the present invention provides user equipment. As shown in FIG. 13, the user equipment may include: a receiver 81 and a transmitter 82.

The receiver 81 is configured to receive a carrier aggregation model sent by a network device.

The transmitter 82 is configured to perform data transmission with the network device according to the carrier aggregation model received by the receiver 81.

The carrier aggregation model includes multiple component carriers, the multiple component carriers include at least one core carrier, and the at least one core carrier includes at least one primary core carrier; the core carrier has an uplink transmission function and a downlink transmission function, the uplink transmission function includes at least one of the following: an uplink feedback function corresponding to downlink data, a downlink channel state feedback function, or an uplink data transmission function, and the downlink transmission function includes at least one of the following: a downlink feedback function corresponding to uplink data, an uplink channel state feedback function, or a downlink data transmission function; and the primary core carrier has at least one of the following functions: a system message bearing function, a paging message bearing function, a semi-static scheduling parameter configuration function, a camping reference function, or an encryption reference function.

In this embodiment of the present invention, further, when the multiple component carriers include at least two core carriers, the receiver 81 is further configured to: after the receiving a carrier aggregation model sent by a network device, receive a primary core carrier change notification message sent by the network device.

The user equipment may further include a processor 83.

The processor 83 is configured to change the primary core carrier to a new primary core carrier according to the primary core carrier change notification message received by the receiver 81.

In this embodiment of the present invention, further, the processor 83 is further configured to: after the changing the primary core carrier to a new primary core carrier according to the primary core carrier change notification message, trigger a random access channel RACH procedure, so that the network device determines, according to the RACH procedure, that the primary core carrier is successfully changed.

In this embodiment of the present invention, further, the primary core carrier change notification message includes a dedicated preamble sequence.

The processor 83 is further configured to: after the changing the primary core carrier to a new primary core carrier according to the primary core carrier change notification message, trigger a RACH procedure by using the dedicated preamble sequence and based on an uplink carrier corresponding to the new primary core carrier, so that the network device determines, according to the dedicated preamble sequence, that the primary core carrier is successfully changed.

In this embodiment of the present invention, further, when the multiple component carriers include at least two core carriers, the processor 83 is further configured to: after the receiver 81 receives the carrier aggregation model sent by the network device, determine to change the primary core carrier, and determine a new primary core carrier from a secondary core carrier, where the secondary core carrier is a core carrier other than the primary core carrier among the at least two core carriers.

The transmitter 82 is further configured to notify the network device that the primary core carrier is changed.

In this embodiment of the present invention, further, the transmitter 82 is specifically configured to trigger, based on an uplink carrier corresponding to the new primary core carrier, a RACH procedure, so that the network device determines, according to the RACH procedure, that the primary core carrier is changed.

In this embodiment of the present invention, further, the transmitter 82 is specifically configured to send an uplink message to the network device, so that the network device determines, according to the uplink message, that the primary core carrier is changed, where the uplink message is used to notify the network device that the primary core carrier is changed.

In this embodiment of the present invention, further, the transmitter 82 is specifically configured to: send, based on one secondary core carrier supporting a scheduling request SR function, an SR to the network device; receive an uplink resource allocated by the network device to the UE; and send the uplink message to the network device by using the uplink resource.

In this embodiment of the present invention, further, the processor 83 is specifically configured to: when determining that a primary core link fails, determine to change the primary core carrier.

In this embodiment of the present invention, further, the processor 83 is specifically configured to: determine the new primary core carrier from the secondary core carrier according to a preset rule.

The preset rule includes at least one of the following: a preset order, quality of a signal transmitted based on the secondary core carrier, or a cell identity corresponding to the secondary core carrier.

In this embodiment of the present invention, further, when the multiple component carriers include at least two core carriers, the receiver 81 is further configured to: after the receiving a carrier aggregation model sent by a network device, receive a measurement event sent by the network device.

The processor 83 is further configured to determine, according to the measurement event received by the receiver unit 81, to report a measurement report to the network device when signal quality or signal strength of a neighboring cell is greater than signal quality or signal strength of a cell corresponding to any one of the core carriers.

It should be noted that, for a specific working process of each functional module of the user equipment provided in this embodiment of the present invention, reference may be made to specific descriptions of a corresponding process in the method embodiments, and details are not described herein again in this embodiment of the present invention.

The UE provided in this embodiment of the present invention receives a carrier aggregation model sent by a network device, and performs data transmission with the network device according to the carrier aggregation model, where the carrier aggregation model includes multiple component carriers, the multiple component carriers include at least one core carrier, and the at least one core carrier includes at least one primary core carrier. By configuring for UE a carrier aggregation model that includes at least one core carrier, an ordinary secondary component carrier and an important secondary component carrier can be distinguished, and the important secondary component carrier is also used as a core carrier. This not only helps management of the important secondary component carrier, but also provides the UE with more options of core carriers.

In addition, when the multiple component carriers include at least two core carriers, the base station may actively trigger a primary core carrier change procedure when determining that the primary core carrier needs to be changed. Compared with the prior art in which UE releases all resources when a link failure occurs on a primary component carrier, leading to communication interruption, this improves stability of communication between the UE and the base station.

The foregoing implementation descriptions allow a person skilled in the art to understand that, for the purpose of convenient and brief description, division of the foregoing function modules is used as an example for illustration. In actual application, the foregoing functions can be allocated to different modules and implemented as required, that is, an inner structure of an apparatus is divided into different function modules to implement all or some of the functions described above.

In the several embodiments provided in the present application, it should be understood that the disclosed apparatus and method may be implemented in other manners. For example, the described apparatus embodiments are merely examples. For example, the module or unit division is merely division of logical functions and may be other division in actual implementation. For example, a plurality of units or components may be combined or integrated into another apparatus, or some features may be ignored or not performed. In addition, the displayed or discussed mutual couplings or direct couplings or communication connections may be indirect couplings or communication connections via some interfaces, apparatuses or units, and may be electrical connections, mechanical connections, or connections in other forms.

The units described as separate parts may or may not be physically separate. Parts displayed as units may be one or more physical units, and may be located in one place or distributed in different places. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of the present invention. The foregoing storage medium includes: any medium that can store program code, such as a USB flash drive, a removable hard disk, a read-only memory (English: Read-Only Memory, ROM for short), a random access memory (English: Random Access Memory, RAM for short), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A carrier configuration method, comprising:
configuring a carrier aggregation model for user equipment (UE), wherein the carrier aggregation model comprising multiple component carriers, the multiple component carriers comprising at least two core carriers and at least one non-core carriers, and the at least two core carriers comprising at least one primary core carrier and at least one secondary core carrier; each of the at least one core carrier has an uplink transmission function and a downlink transmission function, the uplink transmission function comprising the following: an uplink feedback function corresponding to downlink data, a downlink channel state feedback function, and an uplink data transmission function, and the downlink transmission function comprising at least one of the following: a downlink feedback function corresponding to uplink data, an uplink channel state feedback function, or a downlink data transmission function; and the primary core carrier comprising at least one of the following functions: a system message bearing function, a paging message bearing function, a semi-static scheduling parameter configuration function, a camping reference function, or an encryption reference function; and
sending a primary core carrier change notification message to the UE, wherein the primary core carrier change notification message instructs the UE to change a first secondary core carrier to a first primary core carrier.

2. The method according to claim 1, wherein after the sending a primary core carrier change notification message to the UE, the method further comprises:
determining, according to a random access channel (RACH) procedure triggered by the UE, that the primary core carrier of the UE is successfully changed.

3. The method according to claim 1, wherein, after the configuring a carrier aggregation model for user equipment UE, the method further comprises:
receiving a notification that the primary core carrier of the UE is changed.

4. The method according to claim 3, wherein the receiving a notification that the primary core carrier of the UE is changed comprises:
receiving a RACH procedure that is triggered by the UE based on an uplink carrier corresponding to the new primary core carrier; and
after the receiving a notification that the primary core carrier of the UE is changed, the method further comprises:
determining, according to the RACH procedure, that the primary core carrier is changed.

5. A carrier configuration method, comprising:
receiving a carrier aggregation model sent by a network device;
performing data transmission with the network device according to the carrier aggregation model, wherein the carrier aggregation model comprising multiple component carriers, the multiple component carriers comprising at least two core carriers and at least one non-core carriers, and the at least two core carriers comprising at least one primary core carrier and at least one second core carrier; each of the at least one core carrier has an uplink transmission function and a downlink transmission function, the uplink transmission function comprising the following: an uplink feedback function corresponding to downlink data, a downlink channel state feedback function, and an uplink data transmission function, and the downlink transmission function comprising at least one of the following: a downlink feedback function corresponding to uplink data, an uplink channel state feedback function, or a downlink data transmission function; and the primary core carrier comprising at least one of the following functions: a system message bearing function, a paging message bearing function, a semi-static scheduling parameter configuration function, a camping reference function, or an encryption reference function;

receiving a primary core carrier change notification message sent by the network device, wherein the primary core carrier change notification message instructs to change a first secondary core carrier to a first primary core carrier; and changing the first secondary core carrier to the first primary core carrier.

6. The method according to claim 5, wherein after the changing the primary core carrier to a new primary core carrier according to the primary core carrier change notification message, the method further comprises:

triggering a random access channel (RACH) procedure.

7. The method according to claim 5, wherein the determining to change the primary core carrier comprises:

when determining that a primary core link fails, determining to change the primary core carrier.

8. A network device, comprising:

a processor, configured to configure a carrier aggregation model for user equipment (UE), the carrier aggregation model comprising multiple component carriers, the multiple component carriers comprising at least two core carriers and at least one non-core carriers, and the at least two core carriers comprising at least one primary core carrier and at least one secondary core carrier; each of the at least one core carrier has an uplink transmission function and a downlink transmission function, the uplink transmission function comprising the following: an uplink feedback function corresponding to downlink data, a downlink channel state feedback function, and an uplink data transmission function, and the downlink transmission function comprising at least one of the following: a downlink feedback function corresponding to uplink data, an uplink channel state feedback function, or a downlink data transmission function; and the primary core carrier comprising at least one of the following functions: a system message bearing function, a paging message bearing function, a semi-static scheduling parameter configuration function, a camping reference function, or an encryption reference function; and a transmitter, configured to send a primary core carrier change notification message to the UE, wherein the primary core carrier change notification message instructs the UE to change a first secondary core carrier to a first primary core carrier.

9. The network device according to claim 8, wherein the processor is further configured to: after the transmitter sends the primary core carrier change notification message to the UE, determine, according to a random access channel (RACH) procedure triggered by the UE, that the primary core carrier of the UE is successfully changed.

10. The network device according to claim 8, wherein the network device further comprises:

a receiver, configured to: after the processor configures the carrier aggregation model for the user equipment UE, receive a notification that the primary core carrier of the UE is changed.

11. The network device according to claim 10, wherein the receiver is specifically configured to:

receive a RACH procedure that is triggered by the UE based on an uplink carrier corresponding to the new primary core carrier; and the processor is further configured to: after the receiver receives the notification that the primary core carrier of the UE is changed, determine, according to the RACH procedure, that the primary core carrier is changed.

12. User equipment, comprising:

a receiver, configured to receive a carrier aggregation model sent by a network device;

a transmitter, configured to perform data transmission with the network device according to the carrier aggregation model received by the receiver, the carrier aggregation model comprising multiple component carriers, the multiple component carriers comprising at least two core carriers and at least one non-core carriers, and the at least two core carriers comprising at least one primary core carrier and at least one secondary core carrier; each of the at least one core carrier has an uplink transmission function and a downlink transmission function, the uplink transmission function comprising at least one of the following: an uplink feedback function corresponding to downlink data, a downlink channel state feedback function, or an uplink data transmission function, and the downlink transmission function comprising the following: a downlink feedback function corresponding to uplink data, an uplink channel state feedback function, and a downlink data transmission function; and the primary core carrier comprising at least one of the following functions: a system message bearing function, a paging message bearing function, a semi-static scheduling parameter configuration function, a camping reference function, or an encryption reference function; and a processor configured to change a first secondary core carrier to a first primary core carrier based on the receiver receiving a primary core carrier change notification message sent by the network device, wherein the primary core carrier change notification message instructs to change the first secondary core carrier to the first primary core carrier.

13. The user equipment according to claim 12, wherein the processor is further configured to:

after the changing the primary core carrier to a new primary core carrier according to the primary core carrier change notification message, trigger a random access channel (RACH) procedure.

14. The user equipment according to claim 12, wherein the processor is specifically configured to:

when determining that a primary core link fails, determine to change the primary core carrier.

* * * * *